United States Patent Office 2,769,216
Patented Nov. 6, 1956

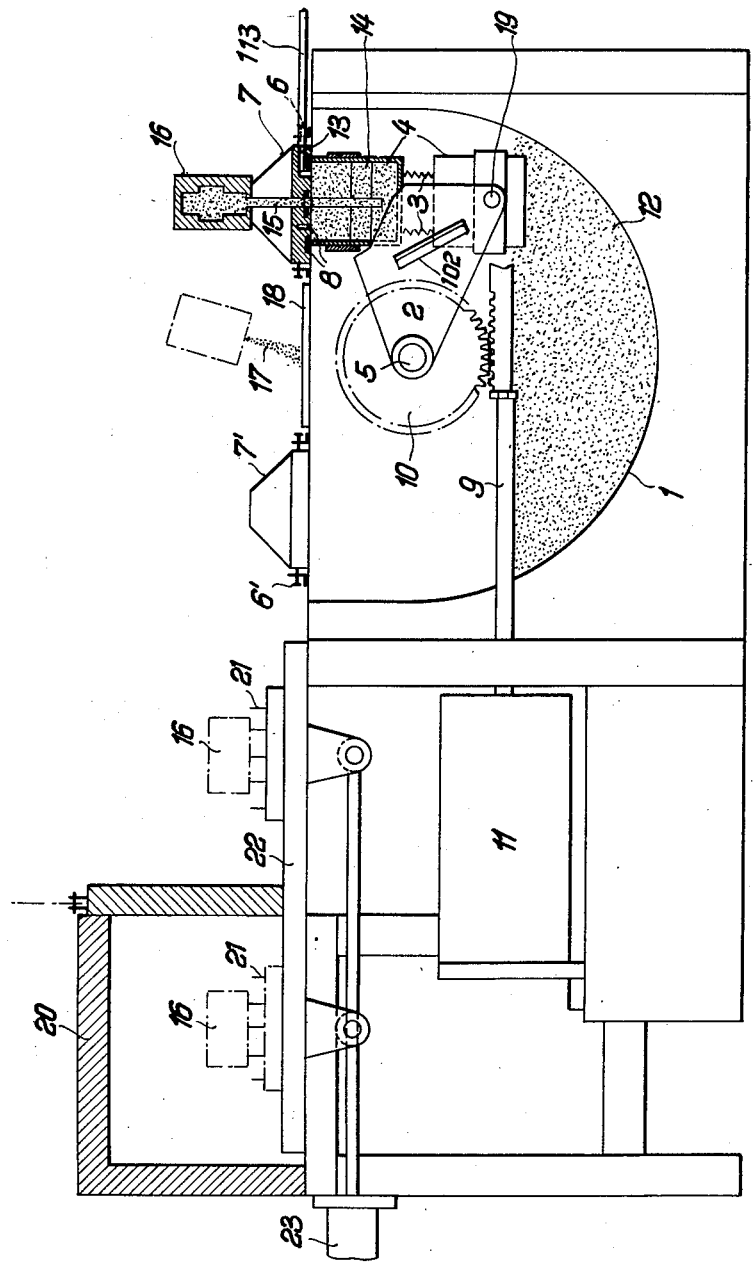

2,769,216

METHOD OF AND APPARATUS FOR PRODUCING HOLLOW CORES FOR FOUNDRY PURPOSES

Adolf Dick and Franz Pölzguter, Bochum, Germany

Application June 29, 1953, Serial No. 364,893

Claims priority, application Germany June 28, 1952

8 Claims. (Cl. 22—10)

The present invention relates to a method of and apparatus for producing, from an easy-flowing dry sand-synthetic resin mixture, hollow cores for foundry purposes, such cores being referred to in the claims hereof as "hollow cores of the kind described." It has been proposed to introduce the said mixture into heated core boxes of metal or the like and, after a required wall thickness has been obtained, to pour out the excess mixture from the said boxes.

Charging and emptying of the core boxes has been effected manually or by pressing the sand-synthetic resin mixture by means of a pressure medium, such as for example, compressed air, from a pressure container into the core boxes, the excess mixture being collected in a separate container, from which it is transferred back into the pressure container.

The simple manual method involves a low rate of production of the hollow cores. Pressure containers have the disadvantage that the charge of the moulding mixture easily separates out prior to being transferred to the core boxes.

The method and apparatus proposed in accordance with the invention avoids or lessens the said disadvantages and promotes increase in output of the cores. The operator may set up the core boxes, empty them and feed the cores into an attached mechanically actuated oven in predetermined sequence.

To the foregoing ends the method according to the present invention consists in moving a ladle through a supply of the sand-synthetic resin mixture so that it successively picks up a charge thereof and comes into sealed connection with a blower head, then delivering fluid under pressure through said head onto the material in the ladle so as to force said material into a suitably arranged heated core box upon the inner surface of which the material attaches itself to form the hollow core. Preferably we move a pair of ladles through the said supply, the said ladles opening in opposite directions and being arranged so that one follows behind the other and so that one of the ladles in each swing picks up a charge and comes into sealed connection with an associated blower head.

The apparatus according to the present invention comprises a container which is maintained under atmospheric pressure. Situated in this container are one or more, but preferably two, movable ladles, which can be moved successively to pick-up a charge from the said supply and then come into sealed engagement with a blower head for forcing mixture picked up by the ladle into a core box. In the movement of the ladle to the blower head, during which it picks up its charge, the ladle moves through the said supply of mixture and promotes the mixing thereof and the maintenance of the desired state of admixture.

One embodiment of apparatus in accordance with the invention is shown as an example in the accompanying drawing in a more or less diagrammatic form and partly in section, although the apparatus shown may be modified without departing from the underlying principle of the invention. The invention will now be more fully described with reference to this embodiment and further features of the invention pointed out.

The apparatus shown comprises a semi-circular container 1 for the moulding mixture and two rocking ladles 4 interconnected by supporting springs 3, the said ladles being mounted on a rocking arm 2 and being assembled with their openings facing away from one another so that the said ladles are movable with a swinging movement to and fro about a pivot point 5 so as to pick up a charge. Two blower heads 7 and 7', respectively, are rockably arranged on the container 1 in bearings 6 and 6', respectively, in one plane in such manner that the rocking ladles 4 may be swung with or up to their rubber packings 8 alternately into sealed relation with one of the blower heads 7 and 7'.

The swinging movement of the rocking ladles 4 is effected in the constructional example illustrated by means of a rack 9 which meshes with a toothed wheel 10 carried on a shaft forming the aforesaid common pivot point 5. The rack may be operated, for example, by the compressed air cylinder 11 provided with pistons or by any other suitable means.

The swinging movement of the rocking ladles 4 from one blower head to the other effects the automatic charging thereof with mixture from the supply 12 through which they are moved. In addition, this movement aids the attainment of a good mixing of the supply mixture. If desired, good mixing may be further promoted by fitting supplementary mixing vanes 102 on the rocking ladle arm 2 and/or on the rocking ladles 4.

The transfer of the mixture from the ladle to the core box 16 is effected by introducing compressed air into the rocking ladle 4 which is in registry with and sealed to a blower head, the said air passing via inlet pipe 113 (which is suitably arranged to clear the bearing 6) through the air supply pipe 13 in the blower head 7 and being controlled by a separate control means. Mixture 14 in the ladle is thus blown from the rocking ladle 4 charged by the previous rocking movement, through a nozzle tube 15 into the core box 16 mounted on the blower head 7, blowing being continued until the box is filled. It is advantageous to operate the blower heads with only a slight positive pressure.

After a layer of the required thickness has attached itself to the heated core box the excess mixture in the core box may be tipped back into the supply container 1 as indicated at 17, through a screen 18 arranged in the cover of the container 1 between the blower heads.

In order satisfactorily to seal the blower heads 7 and the edges of the rocking ladles 4, the journals 19 of the latter and also the journals 6 and 6' of the blower heads 7 are arranged at 90° relatively to one another in order to obtain a universal joint effect.

For the final hardening of the hollow cores produced in the core box 16 and also for heating the core boxes, there is provided an oven 20 which is equipped with a reciprocating slide 21 for accommodating the core boxes 16. The alternate actuation of the slides 21, which slide on the rails 22, is effected by a suitable means of any desired type, this being effected in the present example by the compressed air cylinder 23. It may in certain cases also be effected manually.

The positive pressure delivered to the material picked up by the ladles is low. It is possible to use pressures up to 7 atm., though normally pressures of 1.5–2 atm. are used.

What we claim is:

1. Apparatus for producing hollow cores of the kind described comprising a container for holding a supply of the sand-synthetic resin mixture under atmospheric pressure, a ladle member carried by a rocker arm in said container, means for rocking said arm so as to enable the ladle to pick-up a charge from the said supply and a blower head member connected to said container and arranged so that said ladle member may be rocked by said means into sealed connection with the said blower head member and means enabling a fluid under pressure to be introduced through said blower head member into the ladle member when the ladle member is in sealed connection with the blower head member so that the mixture can be blown from the ladle member into a core box arranged to receive it.

2. Apparatus according to claim 1 comprising a pair of ladle members carried by said rocker arm and arranged so as to present their openings in opposite directions and a pair of blower head members connected to said container and arranged so that as a result of a swing in one direction one ladle member picks up a charge and moves into sealed relation with one of said head members and as a result of a swing in the other direction the other ladle member picks up a charge and moves into sealed relation with the other of said head members.

3. Apparatus according to claim 1 in which the ladle members are resiliently connected to one another.

4. Apparatus according to claim 1 in which at least one of said co-operating ladle and blower head members is pivotally mounted to provide relative movement between said members as a result of their engagement with one another to facilitate the sealing of one to the other.

5. Apparatus according to claim 4 in which the blower head member is pivotally mounted and the pivot axis thereof and the journal axis of the ladle are disposed relatively to one another so that a universal joint effect is produced when the ladle member is being brought into sealed relation with the blower head member.

6. Apparatus according to claim 2 in which the blower head members are arranged at opposite sides of the container and the ladle members are alternately brought into sealed connection with said blower head members.

7. Apparatus according to claim 1 having mixing vanes associated with the rockable ladle member to promote mixing of the supply mixture during the swinging movement of the ladle member.

8. Apparatus for producing hollow cores of the kind described comprising a container for holding a supply of the sand-synthetic resin mixture under atmospheric pressure, a cover therefor having openings, a pair of ladles mounted on a carrier adapted to swing in said container and a pair of blower heads secured at said openings, said ladles being adapted to be alternately swung through and pick-up a charge from the said supply and into registry and sealed connection with a said blower head and means enabling fluid under pressure to be delivered through the blower heads so that when a ladle has been so sealed with a blower head fluid under pressure may be caused to blow the material picked up by the ladle into a suitably disposed core box.

References Cited in the file of this patent

FOREIGN PATENTS 674,422     Great Britain _____ June 25, 1952

OTHER REFERENCES

The Foundry, October 1950; pages 162, 164 and 168. Copy in 22/193 SM.